US012616878B2

(12) United States Patent
Kaneko et al.

(10) Patent No.: US 12,616,878 B2
(45) Date of Patent: May 5, 2026

(54) GOLF BALL

(71) Applicant: Sumitomo Rubber Industries, Ltd., Kobe (JP)

(72) Inventors: Takumi Kaneko, Kobe (JP); Hikaru Nagakura, Kobe (JP); Takehiko Hyodo, Kobe (JP); Kazuyoshi Shiga, Kobe (JP); Yuko Kujirai, Kobe (JP); Hiroaki Tanaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 168 days.

(21) Appl. No.: 18/442,454

(22) Filed: Feb. 15, 2024

(65) Prior Publication Data

US 2024/0278083 A1    Aug. 22, 2024

(30) Foreign Application Priority Data

| | | | |
|---|---|---|---|
| Feb. 16, 2023 | (JP) | ................................. | 2023-022441 |
| Feb. 16, 2023 | (JP) | ................................. | 2023-022442 |
| Jan. 26, 2024 | (JP) | ................................. | 2024-010310 |
| Jan. 26, 2024 | (JP) | ................................. | 2024-010311 |

(51) Int. Cl.

| | |
|---|---|
| *A63B 37/06* | (2006.01) |
| *A63B 37/00* | (2006.01) |
| *C08L 7/00* | (2006.01) |
| *C08L 9/00* | (2006.01) |

(52) U.S. Cl.
CPC ...... *A63B 37/0073* (2013.01); *A63B 37/0078* (2013.01); *A63B 37/008* (2013.01); *A63B 37/0087* (2013.01); *C08L 7/00* (2013.01);

*C08L 9/00* (2013.01); *C08L 2205/025* (2013.01); *C08L 2205/035* (2013.01); *C08L 2312/00* (2013.01)

(58) Field of Classification Search
CPC ............ A63B 37/0073; A63B 37/0078; A63B 37/0087
See application file for complete search history.

(56) References Cited

U.S. PATENT DOCUMENTS

| | | | | |
|---|---|---|---|---|
| 2020/0376347 | A1* | 12/2020 | Hayashi | .................... C08L 9/00 |
| 2021/0002459 | A1* | 1/2021 | Hayashi | ............. A63B 37/0031 |

FOREIGN PATENT DOCUMENTS

| | | |
|---|---|---|
| JP | 60-92780 A | 5/1985 |
| JP | 61-71069 A | 4/1986 |

\* cited by examiner

*Primary Examiner* — Raeann Gorden
(74) *Attorney, Agent, or Firm* — Birch, Stewart, Kolasch & Birch, LLP

(57) ABSTRACT

An object of the present disclosure is to provide a golf ball having lowered resilience while maintaining the hardness of the golf ball. The present disclosure provides a golf ball comprising a constituent member, wherein at least a part of the constituent member is formed from a cured product of a rubber composition containing (a) a base rubber, (b) a co-crosslinking agent and (c) a crosslinking initiator, (a) the base rubber contains (a1) a natural rubber and a grafting ratio of (b) the co-crosslinking agent in the cured product of the rubber composition ranges from 40 mass % to 80 mass %.

15 Claims, 6 Drawing Sheets

GOLF BALL

FIELD OF THE DISCLOSURE

The present disclosure relates to a golf ball.

DESCRIPTION OF THE RELATED ART

Conventionally, as a golf ball used in a driving range, a golf ball travelling a restricted flight distance has been developed. For example, JP S60-92780 A discloses a practice court golf ball obtained by vulcanizing a composition containing 3 to 35 parts by weight of a rubber with low resilience, 20 to 30 parts by weight of methacrylic acid, and 20 to 50 parts by weight of a metal compound which can form a metal salt with methacrylic acid, with respect to 100 parts by weight of a base rubber.

In addition, JP S61-71069 A discloses a range golf ball obtained from a composition containing 3 to 35 parts by weight of an epoxidized natural rubber with an epoxidation degree of 10 to 60 mole %, 20 to 35 parts by weight of methacrylic acid, and 20 to 50 parts by weight of zinc oxide, with respect to 100 parts by weight of a base rubber.

SUMMARY OF THE DISCLOSURE

Recently, a space-limited driving range such as an indoor practice driving range is increasing, and a golf ball travelling a restricted flight distance is desired. However, when the resilience of a golf ball is lowered such that the golf ball can be suitably used even in a narrow driving range, the golf ball tends to become excessively soft.

The present disclosure has been made in view of the above circumstances, and an object of the present disclosure is to provide a golf ball having lowered resilience while maintaining the hardness of the golf ball.

The present disclosure that has solved the above problem provides a golf ball comprising a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber, a grafting ratio of (b) the co-crosslinking agent in the cured product of the rubber composition ranges from 40 mass % to 80 mass %.

In the present disclosure, since the rubber composition contains a natural rubber as the base rubber, the cured product of the rubber composition has a lowered coefficient of restitution. Further, if the grafting ratio of (b) the co-crosslinking agent in the cured product of the rubber composition falls in a range from 40 mass % to 80 mass %, the hardness of the cured product is controlled for a golf ball to have a compression deformation amount adjusted in an appropriate range. Thus, if at least a part of the constituent member of the golf ball is formed of the inventive cured product of the rubber composition, the golf ball has lowered resilience while maintaining a hardness of the golf ball.

In a preferable embodiment of the present disclosure, the golf ball comprises a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber and (a2) a synthetic rubber, a grafting ratio of (b) the co-crosslinking agent in the cured product of the rubber composition ranges from 40 mass % to 80 mass %, the cured product of the rubber composition satisfies the following formula (1) when an amount of (a1) the natural rubber is 40 mass % or less in 100 mass % of (a) the base rubber, and the cured product of the rubber composition satisfies the following formula (2) when an amount of (a1) the natural rubber is more than 40 mass % in 100 mass % of (a) the base rubber.

$$0.70 \le (100-A)/X \le 1.25 \qquad (1)$$

$$0.70 \le A/(100-X) \le 1.25 \qquad (2)$$

[In the formulae (1) and (2), A represents the amount of the natural rubber in the base rubber component (mass %), and X represents the grafting ratio of the co-crosslinking agent (mass %).]

The cured product of the rubber composition used in the present disclosure has a lowered coefficient of restitution by containing (a1) the natural rubber as (a) the base rubber. In addition, if the formula (1) or the formula (2) is satisfied depending on the amount of (a1) the natural rubber, the hardness of the cured product is controlled for a golf ball to have a compression deformation amount adjusted in an appropriate range. Thus, if at least a part of the constituent member of the golf ball is formed of the inventive cured product of the rubber composition, the golf ball has a lowered resilience while maintaining a hardness of the golf ball.

In another preferable embodiment of the present disclosure, the golf ball comprises a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber, and an amount of a graft polymer of (b) the co-crosslinking agent in the cured product of the rubber composition ranges from 10.0 parts by mass to 18.0 pats by mass and an amount of a non-graft polymer of (b) the co-crosslinking agent in the cured product of the rubber composition ranges from 3.0 parts by mass to 15.0 pats by mass with respect to 100 parts by mass of the (a) base rubber.

Since the cured produce of the above rubber composition comprises a natural rubber as (a) the base rubber, the coefficient of restitution is lowered. Further, the amount of the graft polymer of the co-crosslinking agent in the cured product of the rubber composition contributes to lowering the resilience, and the amount of the non-graft polymer of the co-crosslinking agent contributes the hardness. Thus, if the amount of the graft polymer of the co-crosslinking agent falls in a range from 10.0 parts by mass to 18.0 pats by mass and the amount of a non-graft polymer of (b) the co-crosslinking agent falls in a range from 3.0 parts by mass to 15.0 pats by mass with respect to 100 parts by mass of the (a) base rubber, it is possible to lower the resilience while keeping the hardness of the cure product. As a result, the golf ball has the compression deformation amount in an appropriate range. Therefore, if the at least a part of the constituent member is formed of the cured product of the above rubber composition, the resultant golf ball has lowered resilience while keeping the hardness.

In another preferable embodiment of the present disclosure, the golf ball comprises a constituent member, wherein at least a part of the constituent member is formed of a cured product of a rubber composition containing (a) a base rubber, (b) a co-crosslinking agent and (c) a crosslinking initiator, > (a) the base rubber contains (a1) a natural rubber and (a2) a synthetic rubber,
>
> the cured product of the rubber composition satisfies the following formulae (3) and (4)

$$3.5 \le (100-A)/Y \le 5.0 \tag{3}$$

$$3.0 \le A/Z \le 7.0 \tag{4}$$

in the formulae (3) and (4), A represents the amount of (a1) the natural rubber in the base rubber component (mass %), and Y represents an amount (parts by mass) of a graft polymer of (b) the co-crosslinking agent in the cured product of the rubber composition and Z represents an amount (parts by mass) of a non-graft polymer of (b) the co-crosslinking agent in the cured product of the rubber composition with respect to 100 parts by mass of the (a) base rubber.

Since the cured produce of the above rubber composition comprises a natural rubber as (a) the base rubber, the coefficient of restitution is reduced. If the cure product of the rubber composition satisfies the formulae (3) and (4), it is possible to lower the resilience while keeping the hardness of the cure product. As a result, the golf ball has the compression deformation amount in an appropriate range. Therefore, if the at least a part of the constituent member is formed of the cured product of the above rubber composition, the resultant golf ball has lowered resilience while keeping the hardness.

According to the present disclosure, a golf ball having lowered resilience and good hardness is obtained.

DESCRIPTION OF THE PREFERRED EMBODIMENT

[Rubber Composition]

Figure 1:
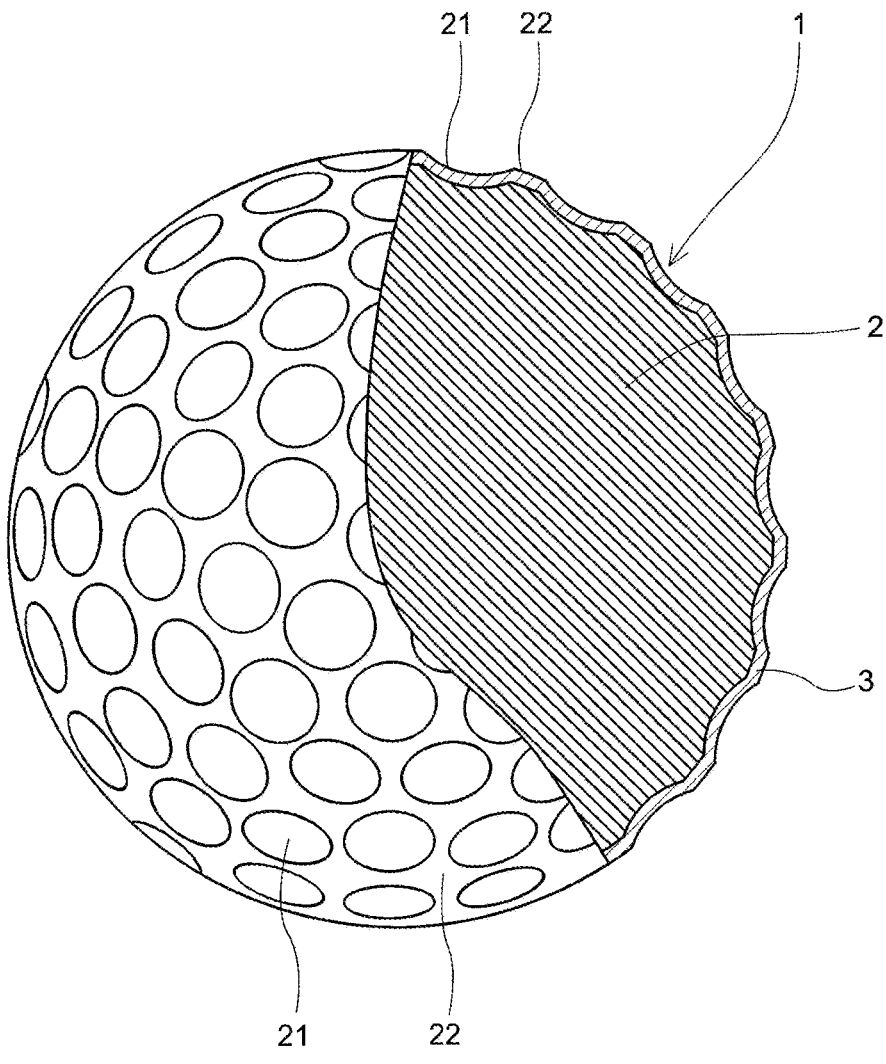
FIG. 1 is a partially cutaway cross-sectional view showing a one-piece golf ball according to one embodiment of the present disclosure.

The golf ball according to the present disclosure comprises a constituent member, wherein at least a part of the constituent member is formed of a cured product of a rubber composition containing (a) a base rubber, (b) a co-crosslinking agent and (c) a crosslinking initiator.

In the cured product of the rubber composition, (b) the co-crosslinking agent reacts with (a) the base rubber to form a crosslinking, thereby providing a hardness or resilience performance. Herein, the crosslinked structure is formed by graft polymerization of (b) the co-crosslinking agent to (a) the base rubber, and since (a) the base rubber contains (a1) the natural rubber, the proportion of graft polymerization in (b) the co-crosslinking agent or the amount of the graft polymer of (b) the co-crosslinking agent is controlled in an appropriate range.

((a) Base Rubber)

(a) The base rubber contains (a1) the natural rubber (NR).

(a1) The natural rubber is prepared by slicing plants that produce natural rubber latex, collecting the latex, and coagulating the rubber component contained in the latex. The natural rubber may be used solely, or at least two of them may be used in combination. The reason for lowering the resilience while keeping the hardness of the golf ball by the above construction is not clear, but considered as follows.

The cured product of the rubber composition has a crosslinking formed by a reaction of (b) the co-crosslinking agent with (a) the base rubber, and thus has a hardness and resilience. Herein, the crosslinking structure is formed by graft-polymerization of (b) the co-crosslinking agent to (a) the base rubber. If (a) the base rubber contains a natural rubber, because of the steric hinderance of polyisoprene constituting a backbone of the natural rubber, (b) the co-crosslinking agent hardly graft-polymerizes and the ratio of the graft-polymerization of (b) the co-crosslinking agent decreases. Thus, the crosslinking contributing to the resilience is hardly formed and the resilience of the cured product is lowered. Further, the grafting ratio or the amount of the graft polymer is controlled in an appropriate range, the non-graft polymer of (b) the co-crosslinking agent is present in the cured product. The presence of the non-graft polymer maintains the hardness of the cured product. Thus, if the cured product is used for a constituent member of the golf ball, it is possible to lower the resilience while keeping the hardness of the golf ball.

Examples of the plant that produce the natural rubber latex include Para rubber tree and Ceara rubber tree which belong to the Euphorbiaceae family; Indian rubber tree, Panama rubber tree and Lagos rubber tree which belong to the Moraceae family; Arabia rubber tree and Tragacanth rubber tree which belong to the Fabaceae family; Jelutong tree, Zanzibar rubber tree, *Funtumia elastica* and *Urceola* which belong to the Apocynaceae family; Guayule rubber tree and Rubber dandelion which belong to the Composite family; Gutta-percha tree, Balata rubber tree and Sapodilla which belong to the Sapotaceae family; *Ipomoea nil* which belongs to the Asclepiadaceae family; and Eucommia which belongs to the Eucommiaceae family.

Examples of the natural rubber include a CV grade in which the rubber viscosity is stabilized by adding a viscosity stabilizer or the like to a raw latex, and a non-CV grade in which the rubber viscosity is not stabilized. The natural rubber may be used solely, or two of them may be used in combination. Among them, the CV grade having the stabilized viscosity is particularly preferable. It is noted that the natural rubber may be either SMR (Standard Malaysia Rubber) or SVR (Standard Vietnam Rubber).

The natural rubber is cis-1,4-polyisoprene, and either a sheet rubber or a block rubber can be used. In addition, the natural rubber also includes a modified product of the natural rubber, i.e. a modified natural rubber such as an epoxidized natural rubber, a methacrylic acid modified natural rubber, a halogen modified natural rubber, a deproteinized natural rubber, a maleic acid modified natural rubber, a sulfonic acid modified natural rubber, and a styrene modified natural rubber. Among them, the natural rubber preferably does not contain the epoxidized natural rubber.

As the natural rubber, Technical Specified Rubbers (TSRR), or Ribbed Smoked Sheet (RSS) is preferable. In addition, the natural rubber may contain a viscosity stabilizer.

The Mooney viscosity ($ML_{1+4}$ (100° C.)) of (a1) the natural rubber is preferably 30 or more, more preferably 35 or more, and even more preferably 40 or more, and is preferably 80 or less, more preferably 75 or less, and even more preferably 70 or less. It is noted that the Mooney viscosity ($ML_{1+4}$ (100° C.)) in the present disclosure is a value measured according to JIS K6300 (2013) using an L rotor under the conditions of preheating time: 1 minute, rotor rotation time: 4 minutes, and temperature: 100° C.

The amount of (a1) the natural rubber is preferably 10 mass % or more, more preferably 20 mass % or more, and even more preferably 30 mass % or more, and is preferably 80 mass % or less, more preferably 75 mass % or less, and even more preferably 70 mass % or less in 100 mass % of (a) the base rubber. If the amount is 10 mass % or more, the golf ball has further lowered resilience, and if the amount is 80 mass % or less, the golf ball has better hardness.

(a) The base rubber may consist of (a1) the natural rubber, or may contain (a1) the natural rubber and (a2) a synthetic rubber. In case that (a) the base rubber contains (a1) the natural rubber and (a2) the synthetic rubber, an amount of (a1) the natural rubber is preferably 10 mass % or more, more preferably 20 mass % or more, and even more preferably 30 mass % or more, and is preferably 80 mass % or less, more preferably 75 mass % or less, and even more preferably 70 mass % or less in 100 mass % of (a) the base rubber. If the amount of (a1) the natural rubber is 10 mass % or more, the golf ball has further lowered resilience, and if the amount of (a1) the natural rubber is 80 mass % or less, the golf ball has better hardness.

((a2) Synthetic Rubber)

Examples of (a2) the synthetic rubber include a diene based rubber such as a polybutadiene rubber (BR), a polyisoprene rubber (IR), a styrene-polybutadiene rubber (SBR), a chloroprene rubber (CR), a butyl rubber (IIR), and an acrylonitrile-butadiene rubber (NBR); and a non-diene based rubber such as an ethylene-propylene rubber (EPM), an ethylene-propylene-diene rubber (EPDM), an urethane rubber, a silicone rubber, an acrylic rubber, an epichlorohydrin rubber, a polysulfide rubber, a fluorine rubber, and a chlorosulfonated polyethylene rubber. The synthetic rubber may be used solely, or two of them may be used in combination.

(a) The base rubber preferably contains the diene based rubber as (a2) the synthetic rubber. In this case, the amount of the diene based rubber is preferably 20 mass % or more, more preferably 25 mass % or more, and even more preferably 30 mass % or more, and is preferably 90 mass % or less, more preferably 80 mass % or less, and even more preferably 70 mass % or less in 100 mass % of (a) the base rubber. If the amount of the diene based rubber is 20 mass % or more, the golf ball has better hardness, and if the amount of the diene based rubber is 90 mass % or less, the golf ball has further lowered resilience.

(a) The base rubber preferably contains a polybutadiene rubber as the diene based rubber. In particular, (a) the base rubber more preferably contains a high-cis polybutadiene having a cis-1,4 bond in an amount of 40 mass % or more, preferably 80 mass % or more, and more preferably 90 mass % or more. The amount of the high-cis polybutadiene in the diene based rubber is preferably 50 mass % or more, more preferably 70 mass % or more, and even more preferably 90 mass % or more. The diene based rubber also preferably consists of the high-cis polybutadiene rubber.

The high-cis polybutadiene preferably has a 1,2-vinyl bond in an amount of 2.0 mass % or less, more preferably 1.7 mass % or less, and even more preferably 1.5 mass % or less.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferable.

The molecular weight distribution Mw/Mn (Mw: weight average molecular weight, Mn: number average molecular weight) of the high-cis polybutadiene is preferably 2.0 or more, more preferably 2.2 or more, and even more preferably 2.4 or more, and is preferably 6.0 or less, more preferably 5.0 or less, and even more preferably 4.0 or less. If the molecular weight distribution (Mw/Mn) of the high-cis polybutadiene falls within the above range, the processibility is enhanced. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

The Mooney viscosity ($ML_{1+4}$ (100° C.)) of the high-cis polybutadiene is preferably 30 or more, more preferably 32 or more, and even more preferably 35 or more, and is preferably 140 or less, more preferably 120 or less, and even more preferably 100 or less.

((b) Co-Crosslinking Agent)

(b) The co-crosslinking agent has an action of crosslinking a rubber molecule by graft polymerization to a molecular chain of the base rubber. (b) The co-crosslinking agent is preferably an α,β-unsaturated carboxylic acid having 3 to 8 carbon atoms. The α,β-unsaturated carboxylic acid used as (b) the co-crosslinking agent preferably has 3 to 8 carbon atoms, more preferably has 3 to 6 carbon atoms, and even more preferably has 3 or 4 carbon atoms. It is noted that the α,β-unsaturated carboxylic acid having 3 to 8 carbon atoms may be used solely, or two or more of them may be used in combination.

Examples of the α,β-unsaturated carboxylic acid having 3 to 8 carbon atoms include acrylic acid, methacrylic acid, fumaric acid, maleic acid, and crotonic acid. In the case that the rubber composition contains only the α,β-unsaturated carboxylic acid having 3 to 8 carbon atoms as the co-crosslinking agent, the rubber composition may further contain (d) a metal compound. This is because neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms.

The co-crosslinking agent may be used as a metal salt. The metal salt of the α,β-unsaturated carboxylic acid having 3 to 8 carbon atoms is preferable as the metal salt of (b) the co-crosslinking agent. In case of using the metal salt of (b) the co-crosslinking agent, an amount excluding a metal component is defined as the blending amount of (b) the co-crosslinking agent.

Examples of the metal component constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ions such as tin, and zirconium. The metal component may be used solely, or at least two of them may be used in combination. Among them, as the metal component, the divalent metal such as magnesium, calcium, zinc, barium, and cadmium is preferable. This is because use of the divalent metal salt of the α,β-unsaturated carboxylic acid having 3 to 8 carbon atoms easily generates a metal crosslinking between the rubber molecules. In particular, as the divalent metal salt, the zinc salt of the α,β-unsaturated carboxylic acid having 3 to 8 carbon atoms is preferable, zinc acrylate is more preferable. It is noted that in case of using the α,β-unsaturated carboxylic acid having 3 to 8 carbon atoms as the co-crosslinking agent and metal salt of the α,β-unsaturated carboxylic acid having 3 to 8 carbon atoms as the metal salt of the co-crosslinking agent in combination, (d) the metal compound may be used as an optional component.

In the case that the metal is the divalent or trivalent metal, the metal salt of the α,β-unsaturated carboxylic acid having 3 to 8 carbon atoms may include another carboxylic acid than the α,β-unsaturated carboxylic acid having 3 to 8 carbon atoms as a carboxylic acid component. Examples of the other carboxylic acids include a saturated carboxylic acid such as caprylic acid, capric acid, lauric acid, myristic acid, palmitic acid, stearic acid, arachidic acid, and behenic acid; and an unsaturated carboxylic acid such as palmitoleic acid, oleic acid, linoleic acid, linolenic acid, and arachidonic acid.

The amount of (b) the co-crosslinking agent is preferably 15 parts by mass or more, more preferably 18 parts by mass or more, and even more preferably 20 parts by mass or more, and is preferably 100 parts by mass or less, more preferably 80 parts by mass or less, even more preferably 60 parts by mass or less, and most preferably 40 parts by mass or less, with respect to 100 parts by mass of (a) the base rubber. If the amount of (b) the co-crosslinking agent is 15 parts by mass or more, the constituent member formed from the rubber composition has a suitable hardness in a small amount of (c) the crosslinking initiator. In addition, if the amount of (b) the co-crosslinking agent is 100 parts by mass or less, the constituent member formed from the rubber composition is not excessively hard, and thus the golf ball has enhanced shot feeling.

In the case that (a) the base rubber contains the diene based rubber, the amount of (b) the co-crosslinking agent is preferably 15 parts by mass or more, more preferably 18 parts by mass or more, and even more preferably 20 parts by mass or more, and is preferably 100 parts by mass or less, more preferably 80 parts by mass or less, and even more preferably 60 parts by mass or less, with respect to 100 parts by mass of the diene based rubber. If the amount of (b) the co-crosslinking agent is 15 parts by mass or more, the constituent member formed from the rubber composition has a suitable hardness in a small amount of (c) the crosslinking initiator. In addition, if the amount of (b) the co-crosslinking agent is 100 parts by mass or less, the constituent member formed from the rubber composition is not excessively hard, and thus the golf ball has enhanced shot feeling.

((c) Crosslinking Initiator)

(c) The crosslinking initiator is blended in order to crosslink (a) the base rubber component. As (c) the crosslinking initiator, an organic peroxide is preferable. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy) hexane, and di-t-butylperoxide. These organic peroxides may be used solely, or at least two of them may be used in combination. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, even more preferably 2.0 parts by mass or less, and most preferably 1.5 parts by mass or less, with respect to 100 parts by mass of (a) the base rubber. If the amount of (c) the crosslinking initiator is 0.2 part by mass or more, the crosslinked rubber molded product formed from the rubber composition is not excessively soft, and if the amount of (c) the crosslinking initiator is 5.0 parts by mass or less, the crosslinked rubber molded product formed from the rubber composition has an appropriate hardness and thus has better durability.

In addition, the amount of the active oxygen of (c) the crosslinking initiator is preferably 0.05 part by mass or more, more preferably 0.10 part by mass or more, and even more preferably 0.15 part by mass or more, and is preferably 1.0 part by mass or less, more preferably 0.8 part by mass or less, even more preferably 0.6 part by mass or less, and most preferably 0.4 part by mass or less, with respect to 100 parts by mass of (b) the co-crosslinking agent. If the amount of the active oxygen of (c) the crosslinking initiator is 0.05 part by mass or more, the golf ball has better hardness, and if the amount of the active oxygen of (c) the crosslinking initiator is 1.0 part by mass or less, the golf ball has further lowered resilience.

((d) Metal Compound)

In the case that the rubber composition contains only the α,β-unsaturated carboxylic acid having 3 to 8 carbon atoms as (b) the co-crosslinking agent, the rubber composition may further contain (d) a metal compound. (d) The metal compound is not particularly limited, as long as (d) the metal compound can neutralize the α,β-unsaturated carboxylic acid having 3 to 8 carbon atoms in the rubber composition.

Examples of (d) the metal compound include a metal hydroxide such as magnesium hydroxide, zinc hydroxide, calcium hydroxide, sodium hydroxide, lithium hydroxide, potassium hydroxide, and copper hydroxide; a metal oxide (excluding titanium oxide) such as magnesium oxide, calcium oxide, zinc oxide, and copper oxide; and a metal carbonate such as magnesium carbonate, zinc carbonate, sodium carbonate, lithium carbonate, and potassium carbonate. (d) The metal compound is preferably the divalent metal compound, more preferably the zinc compound. This is because the divalent metal compound reacts with the α,β-unsaturated carboxylic acid having 3 to 8 carbon atoms, thereby forming a metal crosslinking. In addition, use of the zinc compound provides a golf ball with better hardness. (d) The metal compound may be used solely, or at least two of them may be used in combination.

The amount of (d) the metal compound is preferably 1 part by mass or more, more preferably 2 parts by mass or more, even more preferably 5 parts by mass or more, and most preferably 10 parts by mass or more, and is preferably 100 parts by mass or less, more preferably 90 parts by mass or less, even more preferably 80 parts by mass or less, particularly preferably 70 parts by mass or less, and most preferably 30 parts by mass or less, with respect to 100 parts by mass of (b) the co-crosslinking agent. If the amount of (d) the metal compound falls within the above range, the golf ball has better hardness.

(Other Component)

The rubber composition may further contain additives such as a pigment, a filler for adjusting a weight or the like, an antioxidant, a peptizing agent, a softening agent, and a carboxylic acid, where necessary. In addition, the rubber composition may contain a rubber powder which is obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. In addition, the amount of titanium oxide is preferably 0.5 part by mass or more, more preferably 1 part by mass or more, and is preferably 8 parts by mass or less, more preferably 5 parts by mass or less, with respect to 100 parts by mass of (a) the base rubber.

It is also a preferable embodiment that the rubber composition contains a white pigment and a blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The filler blended in the rubber composition is used as a weight adjusting agent for adjusting the mass of the obtained crosslinked rubber molded product. The filler may be blended where necessary. Examples of the filler include an inorganic filler such as calcium carbonate, barium sulfate, tungsten powder, and molybdenum powder.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

(Preparation of Rubber Composition)

The rubber composition can be obtained by mixing and kneading (a) the base rubber, (b) the co-crosslinking agent, (c) the crosslinking initiator, and the other optional additives. The kneading method is not particularly limited, for example, a conventional kneading machine such as a kneading roll, a Banbury mixer, and a kneader can be used in the kneading method.

(Cured Product of Rubber Composition)

The cured product of the rubber composition can be obtained by heat-molding the kneaded rubber composition in a mold. The molding temperature is preferably 120° C. or more, more preferably 150° C. or more, and is preferably 250° C. or less. In addition, the molding pressure preferably ranges from 2.9 MPa to 11.8 MPa. The molding time preferably ranges from 10 minutes to 60 minutes.

In the cured product of the rubber composition, the grafting ratio of (b) the co-crosslinking agent ranges from 40 mass % to 80 mass %. The grafting ratio is the proportion of the unfree co-crosslinking agent (excluding the metal component) grafting to the base rubber after the curing reaction, relative to the charged amount of the co-crosslinking agent. If the grafting ratio falls within the above range, the resultant golf ball has lowered resilience while keeping the hardness. The grafting ratio is measured by the method which will be described later.

The grafting ratio of (b) the co-crosslinking agent in the cured product of the rubber composition is preferably 40 mass % or more, more preferably 42 mass % or more, even more preferably 45 mass % or more, and is preferably 80 mass % or less, more preferably 78 mass % or less, most preferably 75 mass % or less.

The cured product of the rubber composition preferably satisfies the following formula (1) when the amount of (a1) the natural rubber is 40 mass % or less in 100 mass % of (a) the base rubber.

$$0.70 \le (100-A)/X \le 1.25 \qquad (1)$$

[In the formula (1), A represents the amount of the natural rubber in the base rubber component (mass %), and X represents the grafting ratio of the co-crosslinking agent (mass %).]

If the formula (1) is satisfied, lowered resilience can be achieved while maintaining the hardness of the golf ball.

The value $\{(100-A)/X\}$ is preferably 0.80 or more, more preferably 0.85 or more, and even more preferably 0.90 or more, and is preferably 1.20 or less, more preferably 1.15 or less, and even more preferably 1.10 or less.

The cured product of the rubber composition preferably satisfies the following formula (2) when the amount of (a1) the natural rubber is more than 40 mass % in 100 mass % of (a) the base rubber.

$$0.70 \le A/(100-X) \le 1.25 \qquad (2)$$

[In the formula (2), A represents the amount of the natural rubber in the base rubber component (mass %), and X represents the grafting ratio of the co-crosslinking agent (mass %).]

If the formula (2) is satisfied, lowered resilience can be achieved while maintaining the hardness of the golf ball.

The value $\{A/(100-X)\}$ is preferably 0.80 or more, more preferably 0.85 or more, and even more preferably 0.90 or more, and is preferably 1.20 or less, more preferably 1.15 or less, and even more preferably 1.10 or less.

It is noted that although the reason why the effect is obtained if the formula (1) or the formula (2) is satisfied is not clear, it is considered as follows. It is considered that the co-crosslinking agent grafts to the base rubber to form the crosslinked structure in the crosslinked rubber, thereby exerting the resilience property. Thus, it is considered that if the amount of the co-crosslinking agent grafting to the base rubber is decreased, the resilience property would be lowered. On the other hand, when the crosslinking is not formed, the hardness of the golf ball is hard to be kept. Thus, in the present disclosure, taking advantage of the unique hardness of the natural rubber as a material, the hardness of the golf ball is maintained by blending the natural rubber as the base rubber.

In view of the above, controlling the ratio of the natural rubber to the base rubber and the grafting ratio of the co-crosslinking agent are considered necessary to realize lowered resilience while maintaining the hardness of the golf ball.

Herein, when the amount of the natural rubber in the base rubber is 40 mass % or less, the hardness increasing effect by the natural rubber is small, and thus the crosslinking degree in the other base rubber than the natural rubber becomes important for controlling the hardness of the golf ball. Therefore, when the amount of the natural rubber in the base rubber is 40 mass % or less, the ratio of the amount of the other base rubber than the natural rubber to the proportion of the graft component in the co-crosslinking agent, which satisfies the formula (1), is considered necessary for realizing the lowered resilience while maintaining the hardness of the golf ball.

In addition, when the amount of the natural rubber in the base rubber is more than 40 mass %, the hardness increasing effect by the natural rubber is great, and thus the presence of the non-graft component in the co-crosslinking agent becomes important for controlling the hardness of the golf ball. Therefore, when the amount of the natural rubber in the base rubber is more than 40 mass %, the ratio of the amount of the natural rubber to the proportion of the non-graft component in the co-crosslinking agent, which satisfies the formula (2), is considered necessary for realizing the lowered resilience while maintaining the hardness of the golf ball.

In a preferable embodiment of the present disclosure, the amount of a graft polymer of (b) the co-crosslinking agent in the cured product of the rubber composition ranges from 10.0 parts by mass to 18.0 pats by mass and an amount of a non-graft polymer of (b) the co-crosslinking agent in the cured product of the rubber composition ranges from 3.0 parts by mass to 15.0 pats by mass with respect to 100 parts by mass of the (a) base rubber. The amount of the graft polymer is mass of (b) the co-crosslinking agent (excluding a metal component) that graft-polymerizes to the base rubber after curing and is not free. The amount of the non-graft polymer is mass of the polymer that does not grafted to the base rubber after curing. The amounts of the graft polymer and that non-graft polymer are measured by the method described later. If the amounts of the graft polymer and the non-graft polymer fall within the above range, the golf ball has lowered resilience while keeping the hardness.

The amount of the graft polymer of (b) the co-crosslinking agent in the cured product of the rubber composition is preferably 10.0 parts by mass or more, more preferably 10.2 parts by mass or more, most preferably 10.5 parts by mass or more, and is preferably 18.0 parts by mass or less, more preferably 17.8 parts by mass or less, most preferably 17.5 parts by mass or less, with respect to 100 parts by mass of (a) the base rubber. The amount of the non-graft polymer of (b) the co-crosslinking agent in the cured product of the rubber composition is preferably 3.0 parts by mass or more, more preferably 3.2 parts by mass or more, most preferably 3.5 parts by mass or more, and is preferably 15.0 parts by mass or less, more preferably 14.0 parts by mass or less, most preferably 13.5 parts by mass or less, with respect to 100 parts by mass of (a) the base rubber.

In another preferable embodiment of the present disclosure, the cured product of the rubber composition satisfies the following formulae (3) and (4)

$$3.5 \leq (100-A)/Y \leq 5.0 \tag{3}$$

-continued $$3.0 \leq A/Z \leq 7.0 \tag{4}$$

in the formulae (3) and (4), A represents the amount of (a1) the natural rubber in the base rubber component (mass %), and Y represents an amount (parts by mass) of a graft polymer of (b) the co-crosslinking agent in the cured product of the rubber composition and Z represents an amount (parts by mass) of a non-graft polymer of (b) the co-crosslinking agent in the cured product of the rubber composition with respect to 100 parts by mass of the (a) base rubber.

The value of $\{(100-A)/Y\}$ is preferably 3.5 or more, more preferably 3.6 or more, most preferably 3.7 or more, and is preferably 5.0 or less, more preferably 4.9 or less and most preferably 4.8 or less. The value of (A/Z) is preferably 3.0 or more, more preferably 3.1 or more, most preferably 3.2 or more, and is preferably 7.0 or less, more preferably 6.8 or less and most preferably 6.5 or less.

The reason why the effect is achieved by satisfying the formulae (3) and (4) is not clear, but is considered as follows. It is considered that the co-crosslinking agent grafts to the base rubber to form the crosslinked structure in the crosslinked rubber, thereby exerting the resilience property. Thus, it is considered that if the amount of the co-crosslinking agent grafting to the base rubber is decreased, the resilience property would be lowered. On the other hand, when the crosslinking is not formed, it is difficult to keep the hardness of the golf ball. Herein, the amount of the graft polymer of (b) the co-crosslinking agent in the cured product of the rubber composition contributes the lowered resilience and the amount of the non-graft polymer of (b) the co-crosslinking agent contributes the hardness. Accordingly, a ratio of the rubber component except the natural rubber in the base rubber to the amount of the graft polymer of (b) the co-crosslinking agent controls the degree of lowering the resilience and a ratio of the natural rubber in the base rubber to the amount of the non-graft polymer of (b) the co-crosslinking agent controls the hardness. Thus, if the formulae (3) and (4) are satisfied at the same time, the golf ball has the lowered resilience while keeping the hardness.

The amount of the graft polymer of (b) the co-crosslinking agent in the cured product of the rubber composition is preferably 10.0 parts by mass or more, more preferably 10.2 parts by mass or more, most preferably 10.5 parts by mass or more, and is preferably 18.0 parts by mass or less, more preferably 17.8 parts by mass or less, most preferably 17.5 parts by mass or less, with respect to 100 parts by mass of (a) the base rubber. The amount of the non-graft polymer of (b) the co-crosslinking agent in the cured product of the rubber composition is preferably 3.0 parts by mass or more, more preferably 3.2 parts by mass or more, most preferably 3.5 parts by mass or more, and is preferably 15.0 parts by mass or less, more preferably 14.0 parts by mass or less, most preferably 13.5 parts by mass or less, with respect to 100 parts by mass of (a) the base rubber.

The graft ratio, the amounts of the graft polymer and the non-graft polymer are controlled by types and amounts of (b) the co-crosslinking agents, types and amounts of (c) crosslinking initiator, and amounts of other additives blended in the rubber composition, and the curing conditions of the rubber composition.

[Golf Ball]

The present disclosure includes a golf ball comprising a constituent member, wherein at least a part of the constituent member is formed of a cured product of the rubber composition. Examples of the golf ball include a one-piece golf ball wherein the golf ball body is formed of the cured product of the rubber composition; and a multi-piece golf ball comprising a spherical core and a cover composed of at least one layer and covering the spherical core, wherein at least a part of the spherical core is formed of the cured product of the rubber composition.

(One-Piece Golf Ball)

Examples of the one-piece golf ball include a one-piece golf ball consisting of a golf ball body; and a one-piece golf ball composed of a golf ball body and a paint film covering the golf ball body.

The one-piece golf ball preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the one-piece golf ball preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the one-piece golf ball has a diameter in the range from 40 mm to 45 mm, the compression deformation amount of the one-piece golf ball (shrinking amount of the one-piece golf ball along the compression direction) when applying a load from an initial load of 98 N to a final load of 1275 N to the one-piece golf ball is preferably 2.0 mm or more, more preferably 2.2 mm or more, even more preferably 2.5 mm or more, and most preferably 3.0 mm or more, and is preferably 6.0 mm or less, more preferably 5.5 mm or less, and even more preferably 5.0 mm or less. If the compression deformation amount falls within the above range, the golf ball has better shot feeling.

When the one-piece golf ball has a diameter in the range from 40 mm to 45 mm, the coefficient of restitution (e40) thereof is preferably 0.500 or more, more preferably 0.520 or more, and even more preferably 0.550 or more, and is preferably 0.750 or less, more preferably 0.720 or less, and even more preferably 0.700 or less. If the coefficient of restitution is 0.500 or more, the golf ball can be used as a range golf ball, and if the coefficient of restitution is 0.700 or less, the golf ball has resilience performance suitable for a narrow driving range.

Concave portions called "dimple" are usually formed on the surface of the golf ball body of the one-piece golf ball. The total number of the dimples is preferably 200 or more and 500 or less. If the total number of the dimples is 200 or more, the dimple effect is greater, and if the total number of the dimples is 500 or less, the dimple effect is greater because the size of the respective dimples is big. The shape (shape in a plan view) of the formed dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The golf ball body of the one-piece golf ball can be produced by heat-molding the rubber composition in a mold. The molding temperature is preferably 100° C. or more, more preferably 120° C. or more, and even more preferably 150° C. or more, and is preferably 200° C. or less. In addition, the molding pressure preferably ranges from 2.9 MPa to 11.8 MPa. The molding time preferably ranges from 10 minutes to 60 minutes.

The one-piece golf ball may have a paint film or a mark formed on the surface of the golf ball body. The thickness of the paint film is not particularly limited, and is preferably 5 μm or more, more preferably 7 μm or more, and even more preferably 7 μm or more, and is preferably 50 μm or less, more preferably 40 μm or less, and even more preferably 30 μm or less. If the thickness of the paint film is 5 μm or more, the paint film is hard to wear off for the continued use of the golf ball, and if the thickness of the paint film is 50 μm or less, the dimple effect is not lowered and thus the flight performance of the golf ball is better.

(Multi-Piece Golf Ball)

The multi-piece golf ball is a golf ball comprising a spherical core and a cover composed of at least one layer and covering the spherical core, wherein at least a part of the spherical core is formed of the cured product of the rubber composition.

The construction of the spherical core may be single-layered or multiple-layered. Examples of the spherical core include a single layered core formed of the cured product of the rubber composition; and a dual layered core having an inner layer and an outer layer, wherein the inner layer and/or the outer layer is formed of the cured product of the rubber composition.

The diameter of the spherical core is preferably 34.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick, and thus the impact durability is better. On the other hand, if the diameter of the spherical core is 42.2 mm or less, the cover is not excessively thin, and thus the cover functions better.

When the core has a diameter in the range from 34.8 mm to 42.2 mm, the compression deformation amount of the core (shrinking amount of the core along the compression direction) when applying a load from an initial load of 98 N to a final load of 1275 N to the core is preferably 2.0 mm or more, more preferably 2.3 mm or more, even more preferably 2.5 mm or more, and most preferably 3.0 mm or more, and is preferably 5.0 mm or less, more preferably 4.5 mm or less, and even more preferably 4.3 mm or less. If the compression deformation amount is 2.0 mm or more, the shot feeling is better, and if the compression deformation amount is 5.0 mm or less, the impact durability is better.

The spherical core can be produced by mixing, kneading and molding the rubber composition in a mold. The molding condition is not particularly limited, and the molding is generally carried out at a temperature in a range from 130° C. to 200° C. under a pressure of 2.9 MPa to 11.8 MPa for 10 minutes to 60 minutes.

The cover of the golf ball is formed from a cover composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Tefabloc" available from Mitsubishi Chemical Corporation.

In addition to the resin component described above, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener, as long as these additives don't impair the function of the cover.

Examples of the method for molding the cover of the golf ball include a method which comprises molding the cover composition into a hollow shell, covering the core with a plurality of the hollow shells and performing compression molding (preferably a method which comprises molding the cover composition into a hollow half shell, covering the core with two of the half shells and performing compression molding); and a method which comprises injection molding the cover composition directly onto the core.

The thickness of the cover is preferably 4.0 mm or less, more preferably 3.0 mm or less, and even more preferably 2.0 mm or less. If the thickness of the cover is 4.0 mm or less, the obtained golf ball has better shot feeling. The thickness of the cover is preferably 0.3 mm or more, more preferably 0.4 mm or more, and even more preferably 0.5 mm or more. If the thickness of the cover is 0.3 mm or more, the durability or wear resistance of the cover is better. In the case that the golf ball comprises a plurality of cover layers, the total thickness of a plurality of cover layers preferably falls within the above range.

Concave portions called "dimple" are usually formed on the surface of the cover when molding the cover. The total number of the dimples formed on the cover is preferably 200 or more and 500 or less. If the total number of the dimples is 200 or more, the dimple effect is greater, and if the total number of the dimples is 500 or less, the dimple effect is greater because the size of the respective dimples is big. The shape (shape in a plan view) of the formed dimples includes, for example, without limitation, a circle, a polygonal shape such as a roughly triangular shape, a roughly quadrangular shape, a roughly pentagonal shape, a roughly hexagonal shape, and other irregular shapes. The shape of dimples is employed solely or at least two of them may be used in combination.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is 5 μm or more, the paint film is hard to wear off for the continued use of the golf ball, and if the thickness of the paint film is 50 μm or less, the dimple effect is not lowered and thus the flight performance of the golf ball is better.

The multi-piece golf ball preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball preferably has a mass of 40 g or more and 50 g or less. In light of obtaining greater inertia, the mass is preferably 44 g or more, particularly preferably 45.00 g or more. In light of satisfying a regulation of USGA, the mass is particularly preferably 45.93 g or less.

Figure 2:
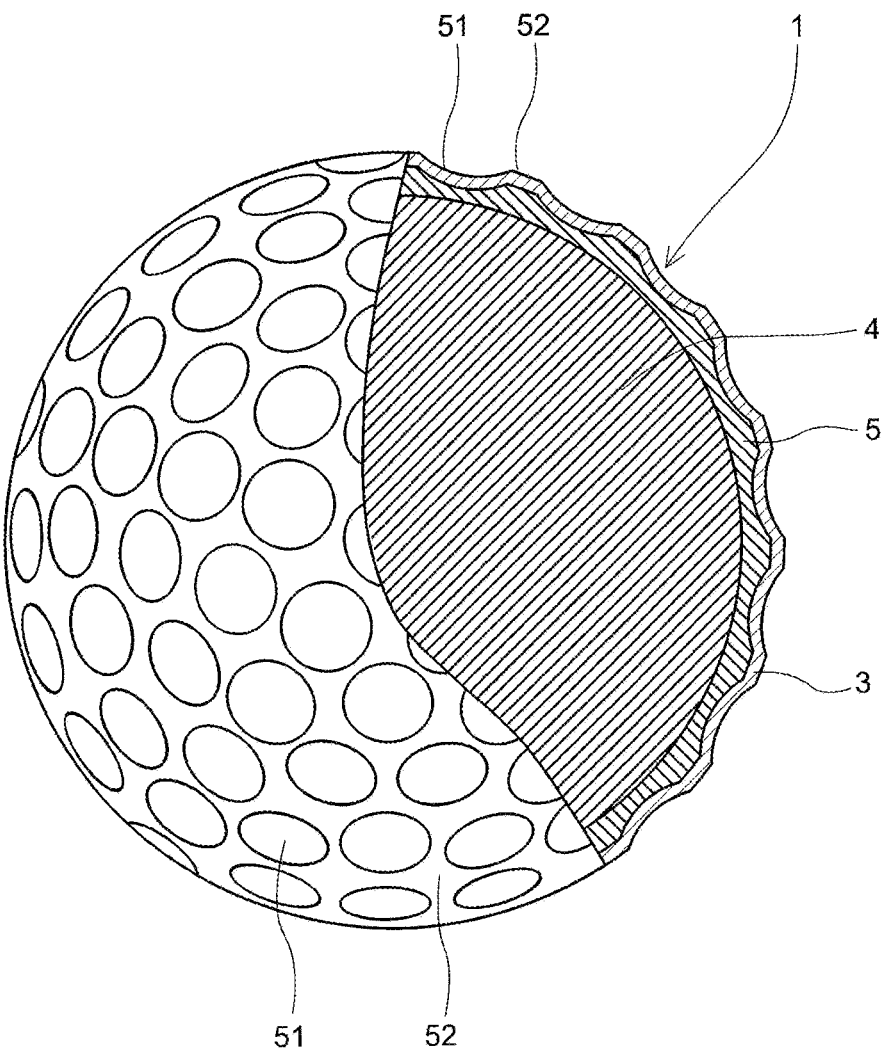
FIG. 2 is a partially cutaway cross-sectional view showing a multi-piece golf ball according to one embodiment of the present disclosure.
Figure 3:
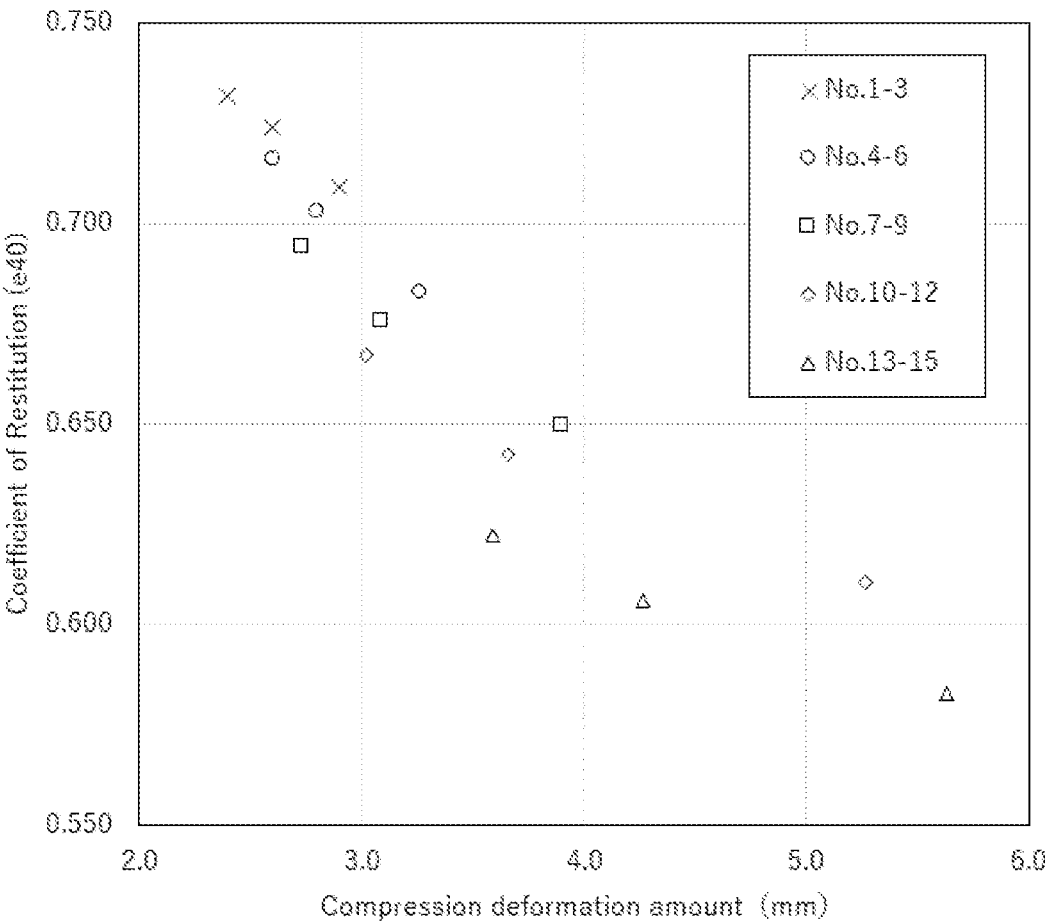
FIG. 3 is a graph showing a relationship between a compression deformation amount and a coefficient of resilience of a golf ball.
Figure 4:
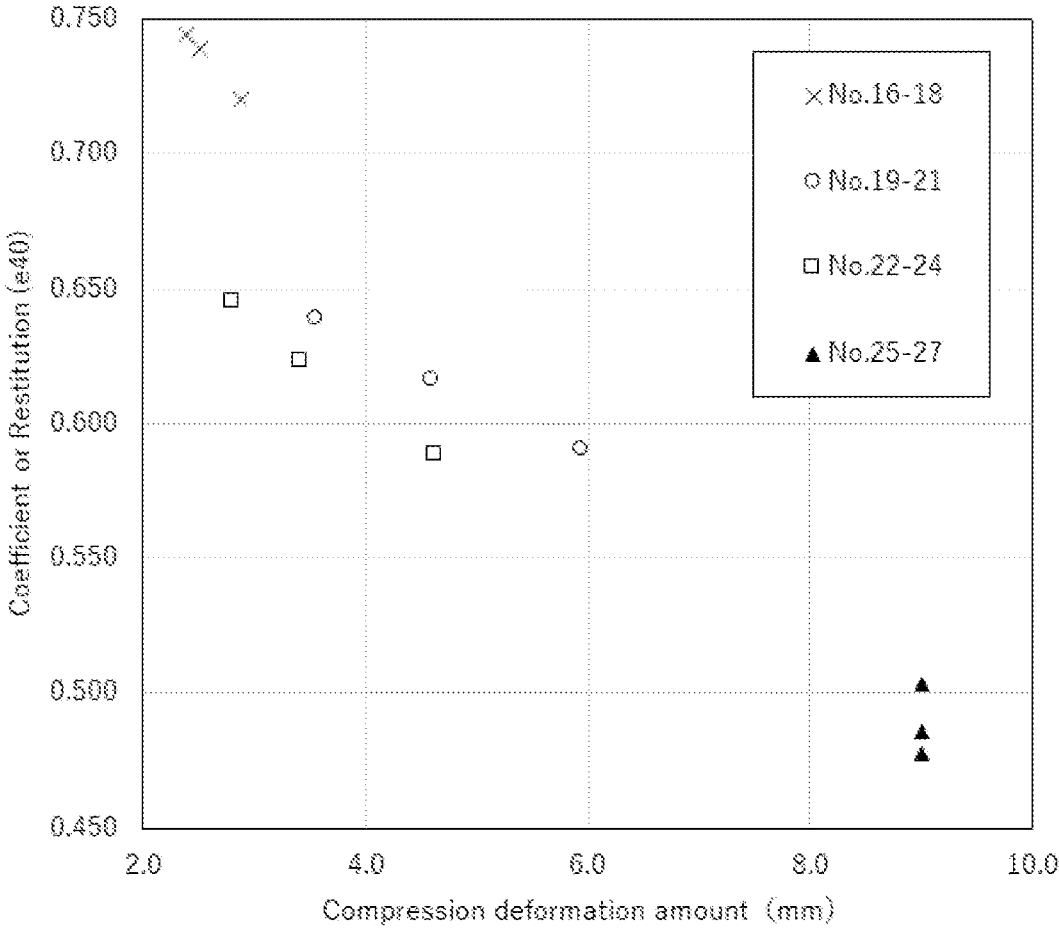
FIG. 4 is a graph showing a relationship between a compression deformation amount and a coefficient of resilience of a golf ball.
Figure 5:
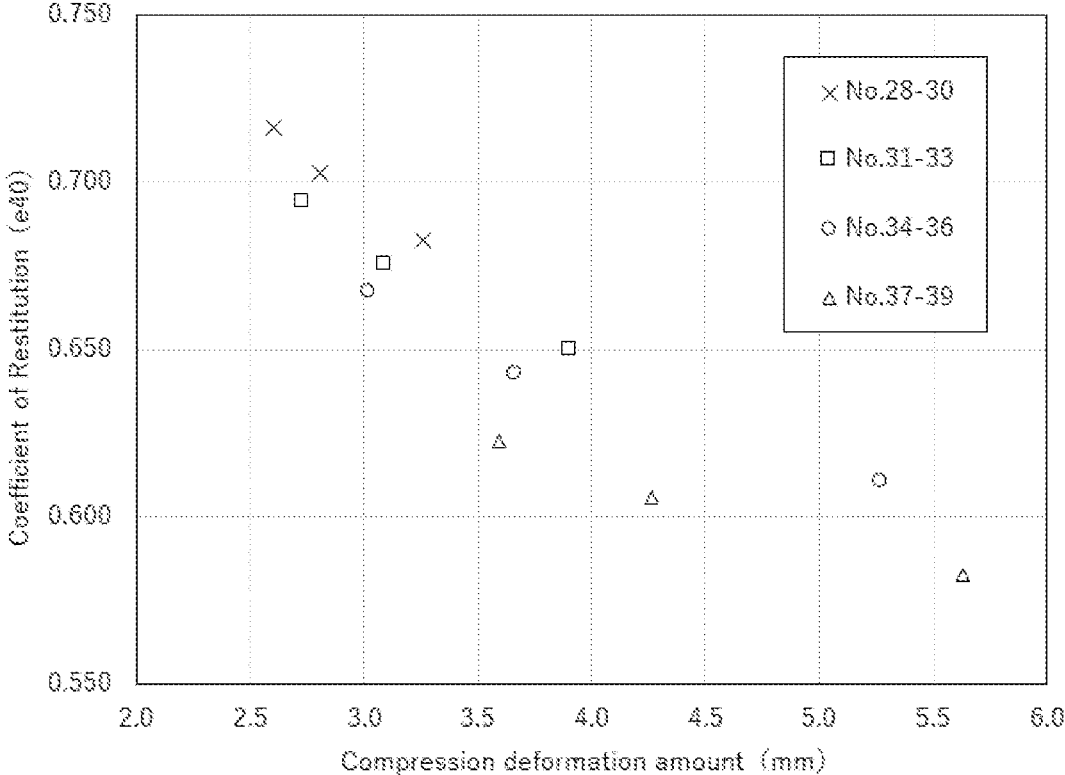
FIG. 5 is a graph showing a relationship between a compression deformation amount and a coefficient of resilience of a golf ball.
Figure 6:
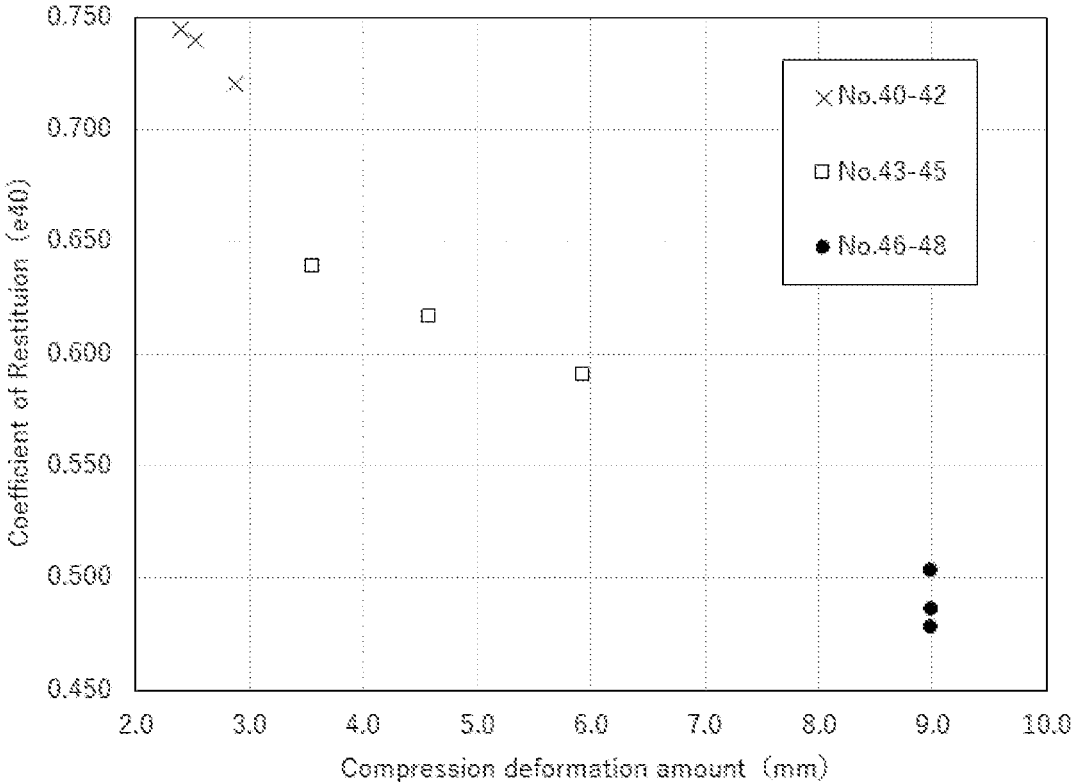
FIG. 6 is a graph showing a relationship between a compression deformation amount and a coefficient of resilience of a golf ball.

Examples of the golf ball according to the present disclosure will be explained with reference to FIGS. 1 and 2. FIG. 1 is a partially cutaway cross-sectional view showing a one-piece golf ball according to one embodiment of the present disclosure. FIG. 2 is a partially cutaway cross-sectional view showing a multi-piece golf ball according to one embodiment of the present disclosure.

The golf ball 1 of FIG. 1 is a one-piece golf ball composed of a golf ball body 2 and a paint film 3 covering the golf ball body 2. A plurality of dimples 21 are formed on the surface of the golf ball body 2. Other portions than the dimples 21 on the surface of the golf ball 1 are lands 22. The golf ball 1 has the paint film 3 formed on an outer side of the golf ball body 2.

The golf ball 1 of FIG. 2 has a golf ball body composed of a spherical core 4 and a cover 5 covering the spherical core 4. A plurality of dimples 51 are formed on the surface of the cover 5. Other portions than the dimples 51 on the surface of the golf ball 1 are lands 52. The golf ball 1 has a paint film 3 formed on an outer side of the cover 5.

Examples

Next, the present disclosure will be described in detail by way of examples. However, the present disclosure is not limited to the examples described below. Various changes and modifications without departing from the spirit of the present disclosure are included in the scope of the present disclosure.

[Evaluation Method]
(1) Grafting Ratio, Amounts of Graft Polymer and Non-Graft Polymer
 (i) The rubber compositions were kneaded with a kneading roll and heat-treated at a temperature of 170° C. for 30 minutes, to prepare a crosslinked rubber slab with a thickness of 0.5 mm. A rubber sheet with a width of 10 mm and a length of 50 mm was cut from the slab for a test piece. The mass (Ma) of the test piece was measured.
 (ii) The test piece was placed in a Soxhlet extractor, and 100 mL of a solvent which was a mixed solution of 150 mL of acetone and 50 mL of hydrochloric acid (6 mol/L) was used to reflux at a temperature of 60° C. for 96 hours.
 (iii) The test piece was discharged from the Soxhlet extractor and washed with acetone, and then elution was conducted at a temperature of 170° C. for 4 hours with a rapid automatic extractor (Soxtherm available from Gerhardt Corporation) using acetone as a solvent.
 (iv) Further, elution was conducted at a temperature of 270° C. for 4 hours with a rapid automatic extractor (Soxtherm available from Gerhardt Corporation) using methanol as a solvent.
 (v) The test piece was discharged from the rapid automatic extractor, and air-dried for 60 minutes in a fume hood.
 (vi) The air-dried test piece was placed in a vacuum oven, and vacuum (degasification) drying was conducted at a temperature of 50° C. for 120 minutes.
 (vii) The mass (Mb) of the test piece after the vacuum drying was measured. It is noted that the mass (Mb) is mass after the metal component in the graft polymer component, the non-graft polymer component and the unreacted co-crosslinking agent component have been eluted.
 (viii) The grafting ratio and the amount of the graft polymer were calculated according to the following formula.

$$\text{Grafting ratio (mass \%)} = \left[ W1 \times \left\{ 1 - (Ma - Mb)/Ma \right\} - W3 \right] / W2 \times 100$$

-continued

Amount of Graft polymer $(phr) = W1 \times \{1 - (Ma - Mb)/Ma\} - W3$

[Grafting ratio: the proportion of the co-crosslinking agent component grafting to the base rubber component contained in the rubber composition (excluding the metal component), Amount of graft polymer: mass of (b) the co-crosslinking agent (excluding a metal component) that graft-polymerizes to the base rubber after curing and is not free, with respect to 100 parts by mass of the base rubber in the crosslinked rubber (phr)

W1: the total mass of the rubber composition when the base rubber contained in the rubber composition is deemed as 100 parts by mass (phr), W2: the amount of the co-crosslinking agent with respect to 100 parts by mass of the base rubber in the rubber composition (phr), W3: the amount of the component (excluding the co-crosslinking agent) not eluted by the elution treatment with respect to 100 parts by mass of the base rubber in the rubber composition (phr), Ma: the mass of the crosslinked rubber before the elution treatment (g), Mb: the mass of the crosslinked rubber after the elution treatment (g)]

(ix) The infrared absorption spectrum was measured to give the intensity values at 911 cm$^{-1}$ and 934 cm$^{-1}$ with respect to the slab of the crosslinked rubber. According to the following formula, the amount of the residual monomer of the co-crosslinking agent in the crosslinked rubber was calculated. In examples of the present disclosure, the rubber composition contains polybutadiene as (a) the base rubber and methacrylic acid as (b) co-crosslinking agent, the peak (911 cm$^{-1}$) derived from a carbon-carbon double bond in the polybutadiene and the peak (934 cm$^{-1}$) derived from methacrylic acid were observed. In case of using other compounds, the peak can be appropriately selected to give the intensity.

$$W4 \ (phr) = 0.1832 \times (I2/I1) + 0.8709$$

[W4: amount of the residual monomer of the co-crosslinking agent with respect to 100 parts by mass of the base rubber in the crosslinked rubber(phr)]

I1: the peak intensity at 911 cm$^{-1}$ in the infrared absorption spectrum

I2: the peak intensity at 934 cm$^{-1}$ in the infrared absorption spectrum (x) The amount of a non-graft polymer is calculated by the following equation.

$$W5 \ (phr) = W2 - W4$$

Amount of non-graft polymer $(phr) = W5 -$ amount of graft polymer

[W5: total amount of the polymerized co-crosslinking agent with respect to 100 parts by mass of the base rubber in the crosslinked rubber, W2: amount of the co-crosslinking agent with respect to 100 parts by mass of the base rubber in the rubber composition, W4: amount of a residual monomer of the co-crosslinking agent with respect to 100 parts by mass of the base rubber in the cured rubber, amount of graft polymer: mass of (b) the co-crosslinking agent (excluding a metal component) that graft-polymerizes to the base rubber after curing and is not free, with respect to 100 parts by mass of the base rubber in the crosslinked rubber (phr)]

(2) Compression Deformation Amount (Mm)

The deformation amount of the golf ball along the compression direction (the shrinking amount of the golf ball along the compression direction), when applying a load from an initial load of 98 N to a final load of 1275 N to the golf ball, was measured.

The compression deformation amount was measured with a YAMADA type compression tester "SCH". The golf ball was placed on a metal rigid plate of the tester. A metal cylinder slowly descended toward the golf ball. The golf ball was sandwiched between the bottom of the cylinder and the rigid plate to deform. The travelling distance of the cylinder when applying a load from an initial load of 98 N to a final load of 1275 N to the golf ball was measured. The travelling speed of the cylinder before applying the initial load was 0.83 mm/s. The travelling speed of the cylinder when applying the load from the initial load to the final load was 1.67 mm/s. Since the measurable range of the compression deformation amount with the above tester is from 0 mm to 9.0 mm, the measuring value is expressed as 9.0 mm when the measured value is more than 9.0 mm.

(3) Coefficient of Restitution

A metal cylindrical object having a mass of 198.4 g was allowed to collide with each golf ball at a speed of 40 m/s, and the speeds of the cylindrical object and the golf ball before and after the collision were measured. The coefficient of restitution of each golf ball was calculated based on the respective speed and mass thereof. The measurement was conducted using twelve samples for each golf ball, and the average value thereof was adopted as the coefficient of restitution of the golf ball.

[Production of One-Piece Golf Ball]

According to the formulations shown in Tables No. 1 to 8, the rubber compositions were kneaded with a kneading roll, and heat-pressed at a temperature of 170° C. for 20 minutes in upper and lower molds, each having a hemispherical cavity, to obtain golf ball bodies having a diameter of 42.77 mm (1.684 inches).

TABLE 1

| | | Golf ball No. | | | | |
|---|---|---|---|---|---|---|
| | | 1 | 2 | 3 | 4 | 5 |
| Formulation | BR730 | 37.9 | 37.9 | 37.9 | 33.7 | 33.7 |
| of rubber | BR01 | 52.1 | 52.1 | 52.1 | 46.3 | 46.3 |
| composition | CV60(NR) | 10 | 10 | 10 | 20 | 20 |
| (parts by | Methacrylic acid | 22 | 22 | 22 | 22 | 22 |
| mass) | DCP | 0.7 | 0.9 | 1.1 | 0.7 | 0.9 |
| | Zinc oxide | 23.4 | 23.4 | 23.4 | 23.4 | 23.4 |
| | Calcium carbonate | 2 | 2 | 2 | 2 | 2 |
| | Titanium oxide | 1 | 1 | 1 | 1 | 1 |
| Amount of co-crosslinking agent with respect to 100 parts by mass of the diene rubber (parts by mass) | | 24 | 24 | 24 | 28 | 28 |
| Amount of active oxygen of crosslinking initiator with respect to 100 parts by mass of co-crosslinking agent (parts by mass) | | 0.18 | 0.24 | 0.29 | 0.18 | 0.24 |
| Grafting ratio of co-crosslinking agent in cured product (mass %) | | 81 | 86 | 85 | 74 | 76 |
| Amount of graft polymer of co-crosslinking agent in cured products (parts by mass) | | 17.8 | 18.9 | 18.7 | 16.4 | 16.7 |
| Amount of non-graft polymer of co-crosslinking agent in cured products (parts by mass) | | 2.2 | 1.3 | 1.1 | 4.2 | 3.9 |
| Compression deformation amount (mm) | | 2.9 | 2.6 | 2.4 | 3.3 | 2.8 |
| Coefficient of restitution (e40) | | 0.709 | 0.724 | 0.732 | 0.683 | 0.703 |

TABLE 2

| | | Golf ball No. | | | | |
|---|---|---|---|---|---|---|
| | | 6 | 7 | 8 | 9 | 10 |
| Formulation | BR730 | 33.7 | 29.5 | 29.5 | 29.5 | 25.3 |
| of rubber | BR01 | 46.3 | 40.5 | 40.5 | 40.5 | 34.7 |
| composition | CV60(NR) | 20 | 30 | 30 | 30 | 40 |
| (parts by | Methacrylic acid | 22 | 22 | 22 | 22 | 22 |
| mass) | DCP | 1.1 | 0.7 | 0.9 | 1.1 | 0.7 |
| | Zinc oxide | 23.4 | 23.4 | 23.4 | 23.4 | 23.4 |
| | Calcium carbonate | 2 | 2 | 2 | 2 | 2 |
| | Titanium oxide | 1 | 1 | 1 | 1 | 1 |
| Amount of co-crosslinking agent with respect to 100 parts by mass of the diene rubber (parts by mass) | | 28 | 31 | 31 | 31 | 37 |
| Amount of active oxygen of crosslinking initiator with respect to 100 parts by mass of co-crosslinking agent (parts by mass) | | 0.29 | 0.18 | 0.24 | 0.29 | 0.18 |
| Grafting ratio of co-crosslinking agent in cured product (mass %) | | 80 | 66 | 69 | 70 | 60 |
| Amount of graft polymer of co-crosslinking agent in cured products (parts by mass) | | 17.6 | 14.5 | 15.1 | 15.5 | 13.1 |
| Amount of non-graft polymer of co-crosslinking agent in cured products (parts by mass) | | 3.2 | 5.6 | 5.1 | 5.0 | 6.7 |
| Compression deformation amount (mm) | | 2.6 | 3.9 | 3.1 | 2.7 | 5.3 |
| Coefficient of restitution (e40) | | 0.716 | 0.650 | 0.675 | 0.694 | 0.610 |

55

TABLE 3

| | | Golf ball No. | | | | |
|---|---|---|---|---|---|---|
| | | 11 | 12 | 13 | 14 | 15 |
| Formulation | BR730 | 25.3 | 25.3 | 16.8 | 16.8 | 16.8 |
| of rubber | BR01 | 34.7 | 34.7 | 23.2 | 23.2 | 23.2 |
| composition | CV60(NR) | 40 | 40 | 60 | 60 | 60 |
| (parts by | Methacrylic acid | 22 | 22 | 22 | 22 | 22 |

TABLE 3-continued

| | | Golf ball No. | | | | |
|---|---|---|---|---|---|---|
| | | 11 | 12 | 13 | 14 | 15 |
| mass) | DCP | 0.9 | 1.1 | 0.9 | 1.1 | 1.3 |
| | Zinc oxide | 23.4 | 23.4 | 23.4 | 23.4 | 23.4 |
| | Calcium carbonate | 2 | 2 | 2 | 2 | 2 |
| | Titanium oxide | 1 | 1 | 1 | 1 | 1 |
| Amount of co-crosslinking agent with respect to 100 parts by mass of the diene rubber (parts by mass) | | 37 | 37 | 55 | 55 | 55 |
| Amount of active oxygen of crosslinking initiator with respect to 100 parts by mass of co-crosslinking agent (parts by mass) | | 0.24 | 0.29 | 0.24 | 0.29 | 0.34 |
| Grafting ratio of co-crosslinking agent in cured product (mass %) | | 61 | 61 | 46 | 47 | 49 |
| Amount of graft polymer of co-crosslinking agent in cured products (parts by mass) | | 13.5 | 13.4 | 10.1 | 10.4 | 10.8 |
| Amount of non-graft polymer of co-crosslinking agent in cured products (parts by mass) | | 6.5 | 6.7 | 9.7 | 9.6 | 9.2 |
| Compression deformation amount (mm) | | 3.7 | 3.0 | 5.6 | 4.3 | 3.6 |
| Coefficient of restitution (e40) | | 0.642 | 0.667 | 0.582 | 0.606 | 0.622 |

TABLE 4

| | | Golf ball No. | | | | | |
|---|---|---|---|---|---|---|---|
| | | 16 | 17 | 18 | 19 | 20 | 21 |
| Formulation of rubber composition (parts by mass) | BR730 | 37.5 | 37.5 | 37.5 | 22.5 | 22.5 | 22.5 |
| | BR01 | 62.5 | 62.5 | 62.5 | 37.5 | 37.5 | 37.5 |
| | CV60(NR) | 0 | 0 | 0 | 40 | 40 | 40 |
| | Methacrylic acid | 22 | 22 | 22 | 27 | 27 | 27 |
| | DCP | 0.5 | 0.7 | 0.9 | 1.1 | 1.3 | 1.5 |
| | Zinc oxide | 23.4 | 23.4 | 23.4 | 23.4 | 23.4 | 23.4 |
| | Calcium carbonate | 2 | 2 | 2 | 2 | 2 | 2 |
| | Titanium oxide | 1 | 1 | 1 | 1 | 1 | 1 |
| Amount of co-crosslinking agent with respect to 100 parts by mass of the diene rubber (parts by mass) | | 22 | 22 | 22 | 45 | 45 | 45 |
| Amount of active oxygen of crosslinking initiator with respect to 100 parts by mass of co-crosslinking agent (parts by mass) | | 0.13 | 0.18 | 0.24 | 0.24 | 0.28 | 0.32 |
| Grafting ratio of co-crosslinking agent in cured product (mass %) | | 90 | 89 | 87 | 58 | 58 | 59 |
| Amount of graft polymer of co-crosslinking agent in cured products (parts by mass) | | 19.9 | 19.5 | 19.2 | 15.7 | 15.6 | 16.0 |
| Amount of non-graft polymer of co-crosslinking agent in cured products (parts by mass) | | 1.0 | 1.4 | 1.7 | 9.9 | 10.0 | 9.5 |
| Compression deformation amount (mm) | | 2.9 | 2.5 | 2.4 | 5.9 | 4.6 | 3.6 |
| Coefficient of restitution (e40) | | 0.720 | 0.739 | 0.745 | 0.591 | 0.616 | 0.639 |

TABLE 5

| | | Golf ball No. | | | | | |
|---|---|---|---|---|---|---|---|
| | | 22 | 23 | 24 | 25 | 26 | 27 |
| Formulation of rubber composition (parts by mass) | BR730 | 22.5 | 22.5 | 22.5 | 0 | 0 | 0 |
| | BR01 | 37.5 | 37.5 | 37.5 | 0 | 0 | 0 |
| | CV60(NR) | 40 | 40 | 40 | 100 | 100 | 100 |
| | Methacrylic acid | 30 | 30 | 30 | 22 | 22 | 22 |
| | DCP | 0.7 | 0.9 | 1.1 | 0.9 | 1.1 | 1.3 |
| | Zinc oxide | 23.4 | 23.4 | 23.4 | 23.4 | 23.4 | 23.4 |

TABLE 5-continued

| | Golf ball No. | | | | | |
|---|---|---|---|---|---|---|
| | 22 | 23 | 24 | 25 | 26 | 27 |
| Calcium carbonate | 2 | 2 | 2 | 2 | 2 | 2 |
| Titanium oxide | 1 | 1 | 1 | 1 | 1 | 1 |
| Amount of co-crosslinking agent with respect to 100 parts by mass of the diene rubber (parts by mass) | 50 | 50 | 50 | — | — | — |
| Amount of active oxygen of crosslinking initiator with respect to 100 parts by mass of co-crosslinking agent (parts by mass) | 0.14 | 0.17 | 0.21 | 0.24 | 0.29 | 0.34 |
| Grafting ratio of co-crosslinking agent in cured product (mass %) | 44 | 44 | 47 | 11 | 6 | 3 |
| Amount of graft polymer of co-crosslinking agent in cured products (parts by mass) | 13.1 | 13.3 | 14.2 | 2.3 | 1.3 | 0.7 |
| Amount of non-graft polymer of co-crosslinking agent in cured products (parts by mass) | 12.9 | 13.2 | 11.4 | 16.8 | 17.8 | 18.7 |
| Compression deformation amount (mm) | 4.6 | 3.4 | 2.8 | 9.0 | 9.0 | 9.0 |
| Coefficient of restitution (e40) | 0.589 | 0.623 | 0.645 | 0.478 | 0.486 | 0.503 |

TABLE 6

| | | Golf ball No. | | | | | |
|---|---|---|---|---|---|---|---|
| | | 28 | 29 | 30 | 31 | 32 | 33 |
| Formulation of rubber composition (parts by mass) | BR730 | 33.7 | 33.7 | 33.7 | 29.5 | 29.5 | 29.5 |
| | BR01 | 46.3 | 46.3 | 46.3 | 40.5 | 40.5 | 40.5 |
| | CV60 (NR) | 20 | 20 | 20 | 30 | 30 | 30 |
| | Methacrylic acid | 22 | 22 | 22 | 22 | 22 | 22 |
| | DCP | 0.7 | 0.9 | 1.1 | 0.7 | 0.9 | 1.1 |
| | Zinc oxide | 23.4 | 23.4 | 23.4 | 23.4 | 23.4 | 23.4 |
| | Calcium carbonate | 2 | 2 | 2 | 2 | 2 | 2 |
| | Titanium oxide | 1 | 1 | 1 | 1 | 1 | 1 |
| Amount A of natural rubber in base rubber (mass %) | | 20 | 20 | 20 | 30 | 30 | 30 |
| Grafting ratio X of co-crosslinking agent in cured product (mass %) | | 74 | 76 | 80 | 66 | 69 | 70 |
| Amount Y of graft polymer of co-crosslinking agent in cured products (parts by mass) | | 16.3 | 16.7 | 17.6 | 14.5 | 15.2 | 15.4 |
| Amount Z of non-graft polymer of co-crosslinking agent in cured products (parts by mass) | | 4.2 | 3.9 | 3.2 | 5.6 | 5.1 | 5.0 |
| Value $\{(100 - A)/X\}$ | | 1.08 | 1.05 | 1.00 | 1.06 | 1.01 | 1.00 |
| Value $\{A/(100 - X)\}$ | | — | — | — | — | — | — |
| Value $\{(100 - A)/Y\}$ | | 4.9 | 4.8 | 4.5 | 4.8 | 4.6 | 4.5 |
| Value $\{A/Z\}$ | | 4.8 | 5.2 | 6.2 | 5.3 | 5.9 | 6.0 |
| Compression deformation amount (mm) | | 3.3 | 2.8 | 2.6 | 3.9 | 3.1 | 2.7 |
| Coefficient of restitution (e40) | | 0.683 | 0.703 | 0.716 | 0.650 | 0.675 | 0.694 |

50

TABLE 7

| | | Golf ball No. | | | | | |
|---|---|---|---|---|---|---|---|
| | | 34 | 35 | 36 | 37 | 38 | 39 |
| Formulation of rubber composition (parts by mass) | BR730 | 25.3 | 25.3 | 25.3 | 16.8 | 16.8 | 16.8 |
| | BR01 | 34.7 | 34.7 | 34.7 | 23.2 | 23.2 | 23.2 |
| | CV60 (NR) | 40 | 40 | 40 | 60 | 60 | 60 |
| | Methacrylic acid | 22 | 22 | 22 | 22 | 22 | 22 |
| | DCP | 0.7 | 0.9 | 1.1 | 0.9 | 1.1 | 1.3 |
| | Zinc oxide | 23.4 | 23.4 | 23.4 | 23.4 | 23.4 | 23.4 |
| | Calcium carbonate | 2 | 2 | 2 | 2 | 2 | 2 |
| | Titanium oxide | 1 | 1 | 1 | 1 | 1 | 1 |

TABLE 7-continued

| | Golf ball No. | | | | | |
|---|---|---|---|---|---|---|
| | 34 | 35 | 36 | 37 | 38 | 39 |
| Amount A of natural rubber in base rubber (mass %) | 40 | 40 | 40 | 60 | 60 | 60 |
| Grafting ratio X of co-crosslinking agent in cured product (mass %) | 60 | 61 | 61 | 46 | 47 | 49 |
| Amount Y of graft polymer of co-crosslinking agent in cured products (parts by mass) | 13.2 | 13.4 | 13.4 | 10.1 | 10.3 | 10.8 |
| Amount Z of non-graft polymer of co-crosslinking agent in cured products (parts by mass) | 6.7 | 6.5 | 6.7 | 9.7 | 9.6 | 9.2 |
| Value {(100 − A)/X} | 1.00 | 0.98 | 0.98 | — | — | — |
| Value {A/(100 − X)} | — | — | — | 1.11 | 1.13 | 1.18 |
| Value {(100 − A)/Y} | 4.5 | 4.5 | 4.5 | 4.0 | 3.9 | 3.7 |
| Value {A/Z} | 6.0 | 6.1 | 6.0 | 6.2 | 6.2 | 6.5 |
| Compression deformation amount (mm) | 5.3 | 3.7 | 3.0 | 5.6 | 4.3 | 3.6 |
| Coefficient of restitution (e40) | 0.610 | 0.642 | 0.667 | 0.582 | 0.606 | 0.622 |

TABLE 8

| | | Golf ball No. | | | | | |
|---|---|---|---|---|---|---|---|
| | | 40 | 41 | 42 | 43 | 44 | 45 |
| Formulation of rubber composition (parts by mass) | BR730 | 37.5 | 37.5 | 37.5 | 22.5 | 22.5 | 22.5 |
| | BR01 | 62.5 | 62.5 | 62.5 | 37.5 | 37.5 | 37.5 |
| | CV60 (NR) | 0 | 0 | 0 | 40 | 40 | 40 |
| | Methacrylic acid | 22 | 22 | 22 | 27 | 27 | 27 |
| | DCP | 0.5 | 0.7 | 0.9 | 1.1 | 1.3 | 1.5 |
| | Zinc oxide | 23.4 | 23.4 | 23.4 | 23.4 | 23.4 | 23.4 |
| | Calcium carbonate | 2 | 2 | 2 | 2 | 2 | 2 |
| | Titanium oxide | 1 | 1 | 1 | 1 | 1 | 1 |
| Amount A of natural rubber in base rubber (mass %) | | 0 | 0 | 0 | 40 | 40 | 40 |
| Grafting ratio X of co-crosslinking agent in cured product (mass %) | | 90 | 89 | 87 | 58 | 58 | 59 |
| Amount Y of graft polymer of co-crosslinking agent in cured products (parts by mass) | | 19.9 | 19.5 | 19.2 | 15.7 | 15.6 | 16.0 |
| Amount Z of non-graft polymer of co-crosslinking agent in cured products (parts by mass) | | 1.0 | 1.4 | 1.7 | 9.9 | 10.0 | 9.5 |
| Value {(100 − A)/X} | | 1.11 | 1.13 | 1.15 | 1.03 | 1.04 | 1.01 |
| Value {A/(100 − X)} | | — | — | — | — | — | — |
| Value {(100 − A)/Y} | | 5.0 | 5.1 | 5.2 | 3.8 | 3.8 | 3.8 |
| Value {A/Z} | | 0.0 | 0.0 | 0.0 | 4.0 | 4.0 | 4.2 |
| Compression deformation amount (mm) | | 2.9 | 2.5 | 2.4 | 5.9 | 4.6 | 3.6 |
| Coefficient of restitution (e40) | | 0.720 | 0.739 | 0.745 | 0.591 | 0.616 | 0.639 |

TABLE 9

| | | Golf ball No. | | |
|---|---|---|---|---|
| | | 46 | 47 | 48 |
| Formulation of rubber composition (parts by mass) | BR730 | 0 | 0 | 0 |
| | BR01 | 0 | 0 | 0 |
| | CV60 (NR) | 100 | 100 | 100 |
| | Methacrylic acid | 22 | 22 | 22 |
| | DCP | 0.9 | 1.1 | 1.3 |
| | Zinc oxide | 23.4 | 23.4 | 23.4 |
| | Calcium carbonate | 2 | 2 | 2 |
| | Titanium oxide | 1 | 1 | 1 |
| Amount A of natural rubber in base rubber (mass %) | | 100 | 100 | 100 |
| Grafting ratio X of co-crosslinking agent in cured product (mass %) | | 11 | 6 | 3 |
| Amount Y of graft polymer of co-crosslinking agent in cured products (parts by mass) | | 2.3 | 1.3 | 0.7 |
| Amount Z of non-graft polymer of co-crosslinking agent in cured | | 16.8 | 17.8 | 18.7 |

TABLE 9-continued

| | Golf ball No. | | |
|---|---|---|---|
| | 46 | 47 | 48 |
| products (parts by mass) | | | |
| Value {(100 − A)/X} | — | — | — |
| Value {A/(100 − X)} | 1.12 | 1.06 | 1.03 |
| Value {(100 − A)/Y} | 0.0 | 0.0 | 0.0 |
| Value {A/Z} | 5.9 | 5.6 | 5.3 |
| Compression deformation amount (mm) | 9.0 | 9.0 | 9.0 |
| Coefficient of restitution (e40) | 0.478 | 0.486 | 0.503 |

BR730: "BR730" (high-cis polybutadiene rubber (amount of cis-1,4 bond=96 mass %, amount of 1,2-vinyl bond=1.3 mass %, Moony viscosity (ML$_{1+4}$ (100° C.)=55, molecular weight distribution (Mw/Mn)=3)) available from JSR Corporation BR01: "BR01" (high-cis butadiene rubber (amount of cis-1,4 bond=95 mass %, Moony viscosity (ML$_{1+4}$ (100° C.)=45) available from JSR Corporation CV60 (NR): natural rubber (Moony viscosity (ML$_{1+4}$ (100° C.)=60) Methacrylic acid: available from Mitsubishi Chemical Corporation DCP: "Percumyl (registered trademark) D" (dicumyl peroxide, amount of active oxygen: 5.92 mass %) available from NOF Corporation Zinc oxide: "Ginrei R" (zinc oxide) available from Toho Zinc Co., Ltd.

Calcium carbonate: "Whiton BF-300" available from Shiraishi Calcium Kaisha Ltd.

Titanium oxide: "CR-60" available from Ishihara Sangyo Kaisha, Ltd.

The evaluation results of each golf ball are shown in Tables No. 1 to 8. The compression deformation amounts of golf balls No. 25 to 27 were expressed as 9.0 mm, because the measured values thereof were more than 9.0 mm. In addition, the relationship between the compression deformation amount and the coefficient of resilience of each golf ball is shown in FIG. 3 to FIG. 6.

As shown in FIG. 3 to FIG. 6, the golf ball having a greater compression deformation amount has a smaller coefficient of restitution, and the golf ball having a smaller compression deformation amount has a greater coefficient of restitution. Thus, it can be said that the golf ball located at the lower-left side in the graph of FIG. 3 to FIG. 6 has lowered resilience while maintaining the hardness.

The golf balls No. 4 to 15 and 19 to 24 have a grafting ratio in a range from 40 mass % to 80 mass % or satisfy the condition that an amount of the graft polymer of (b) the co-crosslinking agent in the cured product of the rubber composition ranges from 10.0 parts by mass to 18.0 pats by mass and an amount of the non-graft polymer of (b) the co-crosslinking agent in the cured product of the rubber composition ranges from 3.0 parts by mass to 15.0 pats by mass with respect to 100 parts by mass of the (a) base rubber. These golf balls No. 4 to 15 and 19 to 24 have lowered resilience while maintaining the hardness.

On the contrary, the golf balls No. 1 to 3 have a grafting ratio of more than 80 mass %, or meet the condition that an amount of the non-graft polymer of the co-crosslinking agent is less than 3.0 parts by mass with respect to 100 parts by mass of the base polymer. These golf balls No. 1 to 3 do not have lowered resilience. It is noted that these golf balls No. 1 to 3 have high hardness, because the grafting ratio is high, although the amount of the non-graft polymer is small.

The golf balls No. 16 to 18 do not contain the natural rubber as (a) the base rubber. These golf balls No. 16 to 18 do not have lowered resilience.

The golf balls No. 25 to 27 have a grafting ratio of less than 40 mass % or meet the condition that the amount of the non-graft polymer of (b) the co-crosslinking agent is more than 15.0 parts by mass with respect to 100 parts by mass of the base rubber. These golf balls No. 25 to 27 do not keep the hardness.

The golf balls No. 28 to 39 and 43 to 45 contain (a1) the natural rubber and (a2) the synthetic rubber, have the grafting ratio of 40 mass % to 80 mass %, and satisfy the formula (1) or (2), or the formula (3) or (4). These golf balls No. 28 to 39 and 43 to 45 have lowered resilience while keeping the hardness.

The golf balls No. 40 to 42 do not contain the natural rubber as (a) the base rubber. These golf balls No. 40 to 42 do not have lowered resilience.

The golf balls No. 46 to 48 do not contain the synthetic rubber as (a) the base rubber. These golf balls No. 46 to 48 do not keep the hardness.

The preferable embodiment (1) of the present disclosure is a golf ball comprising a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber, and a grafting ratio of (b) the co-crosslinking agent in the cured product of the rubber composition ranges from 40 mass % to 80 mass %.

The preferable embodiment (2) of the present disclosure is a golf ball comprising a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber, and an amount of a graft polymer of (b) the co-crosslinking agent in the cured product of the rubber composition ranges from 10.0 parts by mass to 18.0 pats by mass and an amount of a non-graft polymer of (b) the co-crosslinking agent in the cured product of the rubber composition ranges from 3.0 parts by mass to 15.0 pats by mass with respect to 100 parts by mass of the (a) base rubber.

The preferable embodiment (3) of the present disclosure is the golf ball according to the embodiment (1) or (2), wherein the amount of (a1) the natural rubber is 10 mass % or more in 100 mass % of (a) the base rubber.

The preferable embodiment (4) of the present disclosure is the golf ball according to any one of the embodiments (1) to (3), wherein the amount of (a1) the natural rubber is 20 mass % or more and 80 mass % or less in 100 mass % of (a) the base rubber.

The preferable embodiment (5) of the present disclosure is the golf ball according to any one of the embodiments (1) to (4), wherein the golf ball is a one-piece golf ball, and a golf ball body thereof is formed of the cured product of the rubber composition.

The preferable embodiment (6) of the present disclosure is the golf ball according to any one of the embodiments (1) to (5), wherein the golf ball has a diameter ranging from 40 mm to 45 mm, a compression deformation amount (shrinking amount along the compression direction) ranging from 2.0 mm to 6.0 mm when applying a load from an initial load of 98 N to a final load of 1275 N to the golf ball, and a coefficient of restitution (e40) ranging from 0.500 to 0.700.

The preferable embodiment (7) of the present disclosure is the golf ball according to the embodiment (6), wherein the compression deformation amount ranges from 3.0 mm to 6.0 mm.

The preferable embodiment (8) of the present disclosure is a golf ball comprising a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber and (a2) a synthetic rubber, a grafting ratio of (b) the co-crosslinking agent in the cured product of the rubber composition ranges from 40 mass % to 80 mass %, the cured product of the rubber composition satisfies the following formula (1) when an amount of (a1) the natural rubber is 40 mass % or less in 100 mass % of (a) the base rubber, and the cured product of the rubber composition satisfies the following formula (2) when an amount of (a1) the natural rubber is more than 40 mass % in 100 mass % of (a) the base rubber.

$$0.70 \le (100-A)/X \le 1.25 \qquad (1)$$

$$0.70 \le A/(100-X) \le 1.25 \qquad (2)$$

[In the formulae (1) and (2), A represents the amount of (a1) the natural rubber in the base rubber component (mass %), and X represents the grafting ratio of the co-crosslinking agent (mass %).]

The preferable embodiment (9) of the present disclosure is a golf ball comprising a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber and (a2) a synthetic rubber, the cured product of the rubber composition satisfies the following formulae (3) and (4)

$$3.5 \le (100-A)/Y \le 5.0 \qquad (3)$$

$$3.0 \le A/Z \le 7.0 \qquad (4)$$

in the formulae (3) and (4), A represents the amount of (a1) the natural rubber in the base rubber component (mass %), and Y represents an amount (parts by mass) of a graft polymer of (b) the co-crosslinking agent in the cured product of the rubber composition and Z represents an amount (parts by mass) of a non-graft polymer of (b) the co-crosslinking agent in the cured product of the rubber composition with respect to 100 parts by mass of the (a) base rubber.

The preferable embodiment (10) of the present disclosure is the golf ball according to the embodiments (8) or (9), wherein the amount of (a1) the natural rubber in 100 mass % of (a) the base rubber is 10 mass % or more.

The preferable embodiment (11) of the present disclosure is the golf ball according to any one of the embodiments (8) to (10), wherein the golf ball is a one-piece golf ball, and a golf ball body thereof is formed of the cured product of the rubber composition.

The preferable embodiment (12) of the present disclosure is the golf ball according to any one of the embodiments (8) to (11), wherein the golf ball has a diameter ranging from 40 mm to 45 mm, a compression deformation amount (shrinking amount along the compression direction) ranging from 2.5 mm to 6.0 mm when applying a load from an initial load of 98 N to a final load of 1275 N to the golf ball, and a coefficient of restitution (e40) ranging from 0.500 to 0.700.

The preferable embodiment (13) of the present disclosure is the golf ball according to the present disclosure (12), wherein the compression deformation amount ranges from 3.0 mm to 6.0 mm.

This application is based on Japanese Patent applications No. 2023-22441 and No. 2023-22442 filed on Feb. 16, 2023, No. 2024-10310 and No. 2024-10311 filed on Jan. 26, 2024, the contents of which are hereby incorporated by reference.

The invention claimed is:

1. A one-piece golf ball comprising a golf ball body, wherein the golf ball body is formed of a cured product of a rubber composition containing (a) a base rubber, (b) a co-crosslinking agent and (c) a crosslinking initiator, wherein (a) the base rubber contains (a1) a natural rubber, a grafting ratio of (b) the co-crosslinking agent in the cured product of the rubber composition ranges from 40 mass % to 80 mass %, and the one-piece golf ball has a diameter ranging from 40 mm to 45 mm, a compression deformation amount (shrinking amount along the compression direction) ranging from 2.0 mm to 6.0 mm when applying a load from an initial load of 98 N to a final load of 1275 N to the one-piece golf ball, and a coefficient of restitution (e40) ranging from 0.500 to 0.700.

2. The golf ball according to claim 1, wherein an amount of (a1) the natural rubber is 10 mass % or more in 100 mass % of (a) the base rubber.

3. The golf ball according to claim 1, wherein an amount of (a1) the natural rubber ranges from 20 mass % to 80 mass % in 100 mass % of (a) the base rubber.

4. A one-piece golf ball comprising a golf ball body, wherein the golf ball body is formed of a cured product of a rubber composition containing (a) a base rubber, (b) a co-crosslinking agent and (c) a crosslinking initiator, wherein (a) the base rubber contains (a1) a natural rubber, an amount of a graft polymer of (b) the co-crosslinking agent in the cured product of the rubber composition ranges from 10.0 parts by mass to 18.0 parts by mass, an amount of a non-graft polymer of (b) the co-crosslinking agent in the cured product of the rubber composition ranges from 3.0 parts by mass to 15.0 parts by mass with respect to 100 parts by mass of the (a) base rubber, and the one-piece golf ball has a diameter ranging from 40 mm to 45 mm, a compression deformation amount (shrinking amount along the compression direction) ranging from 2.0 mm to 6.0 mm when applying a load from an initial load of 98 N to a final load of 1275 N to the one-piece golf ball, and a coefficient of restitution (e40) ranging from 0.500 to 0.700.

5. The golf ball according to claim 4, wherein an amount of (a1) the natural rubber is 10 mass % or more in 100 mass % of (a) the base rubber.

6. The golf ball according to claim 4, wherein an amount of (a1) the natural rubber ranges from 20 mass % to 80 mass % in 100 mass % of (a) the base rubber.

7. A golf ball comprising a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber and (a2) a synthetic rubber, and the cured product of the rubber composition satisfies the following formulae (3) and (4)

$$3.5 \le (100-A)/Y \le 5.0 \qquad (3)$$

$$3.0 \le A/Z \le 7.0 \qquad (4)$$

wherein in the formulae (3) and (4),

A represents the amount of (a1) the natural rubber in the base rubber component (mass %), Y represents an amount (parts by mass) of a graft polymer of (b) the co-crosslinking agent in the cured product of the rubber composition and Z represents an amount (parts by mass) of a non-graft polymer of (b) the co-crosslinking agent in the cured product of the rubber composition with respect to 100 parts by mass of the (a) base rubber.

8. The golf ball according to claim 7, wherein the amount of (a1) the natural rubber is 10 mass % or more in 100 mass % of (a) the base rubber.

9. The golf ball according to claim 7, wherein the golf ball is a one-piece golf ball, and a golf ball body thereof is formed from the cured product of the rubber composition.

10. The golf ball according to claim 7, wherein the golf ball has a diameter ranging from 40 mm to 45 mm, a compression deformation amount (shrinking amount along the compression direction) ranging from 2.5 mm to 6.0 mm when applying a load from an initial load of 98 N to a final load of 1275 N to the golf ball, and a coefficient of restitution (e40) ranging from 0.500 to 0.700.

11. The golf ball according to claim 10, wherein the compression deformation amount ranges from 3.0 mm to 6.0 mm.

12. A golf ball comprising a constituent member, wherein at least a part of the constituent member is formed of a cured product of a rubber composition containing (a) a base rubber, (b) a co-crosslinking agent and (c) a crosslinking initiator, (a) the base rubber contains (a1) a natural rubber and (a2) a synthetic rubber, a grafting ratio of (b) the co-crosslinking agent in the cured product of the rubber composition ranges from 40 mass % to 80 mass %, the cured product of the rubber composition satisfies the following formula (1) when an amount of (a1) the natural rubber is 40 mass % or less in 100 mass % of (a) the base rubber, and the cured product of the rubber composition satisfies the following formula (2) when an amount of (a1) the natural rubber is more than 40 mass % in 100 mass % of (a) the base rubber:

$$0.70 \le (100-A)/X \le 1.25 \qquad (1)$$

$$0.70 \le A/(100-X) \le 1.25 \qquad (2)$$

wherein in the formulae (1) and (2), A represents the amount of (a1) the natural rubber in the base rubber component (mass %), and X represents the grafting ratio of the co-crosslinking agent (mass %), and the golf ball has a diameter ranging from 40 mm to 45 mm, a compression deformation amount (shrinking amount along the compression direction) ranging from 2.5 mm to 6.0 mm when applying a load from an initial load of 98 N to a final load of 1275 N to the golf ball, and a coefficient of restitution (e40) ranging from 0.500 to 0.700.

13. The golf ball according to claim 12, wherein the amount of (a1) the natural rubber is 10 mass % or more in 100 mass % of (a) the base rubber.

14. The golf ball according to claim 12, wherein the golf ball is a one-piece golf ball, and a golf ball body thereof is formed from the cured product of the rubber composition.

15. The golf ball according to claim 12, wherein the compression deformation amount ranges from 3.0 mm to 6.0 mm.

* * * * *